(12) United States Patent
Hollums et al.

(10) Patent No.: US 8,537,696 B2
(45) Date of Patent: *Sep. 17, 2013

(54) SYSTEM, METHOD, AND COMPUTER PROGRAM PRODUCT FOR SCHEDULING BURST PROFILE CHANGES BASED ON MINISLOT COUNT

(75) Inventors: A. Scott Hollums, Duluth, GA (US); Niki R. Pantelias, Duluth, GA (US); David A. Ferguson, Atlanta, GA (US)

(73) Assignee: Broadcom Corporation, Irvine, CA (US)

( * ) Notice: Subject to any disclaimer, the term of this patent is extended or adjusted under 35 U.S.C. 154(b) by 1032 days.

This patent is subject to a terminal disclaimer.

(21) Appl. No.: 11/905,728

(22) Filed: Oct. 3, 2007

(65) Prior Publication Data
US 2008/0037575 A1 Feb. 14, 2008

Related U.S. Application Data

(63) Continuation of application No. 09/881,734, filed on Jun. 18, 2001, now Pat. No. 7,379,469.

(60) Provisional application No. 60/261,273, filed on Jan. 12, 2001.

(51) Int. Cl.
*H04L 1/00* (2006.01)
*H04J 3/14* (2006.01)
*G08C 15/00* (2006.01)
*G06F 11/00* (2006.01)

(52) U.S. Cl.
USPC ............................ 370/252; 370/392; 370/419

(58) Field of Classification Search
USPC .......... 370/235–395, 412–508; 709/221–331
See application file for complete search history.

(56) References Cited

U.S. PATENT DOCUMENTS

| | | | | |
|---|---|---|---|---|
| 5,577,206 | A | * | 11/1996 | Friedrich et al. ............... 709/221 |
| 5,696,765 | A | * | 12/1997 | Safadi ........................... 370/436 |
| 5,963,557 | A | * | 10/1999 | Eng ............................... 370/432 |
| 6,108,713 | A | | 8/2000 | Sambamurthy et al. |
| 6,215,792 | B1 | | 4/2001 | Abi-Nassif |
| 6,275,498 | B1 | * | 8/2001 | Bisceglia et al. ............. 370/438 |
| 6,459,703 | B1 | | 10/2002 | Grimwood et al. |
| 6,650,624 | B1 | * | 11/2003 | Quigley et al. ............... 370/252 |
| 6,714,589 | B1 | | 3/2004 | Cole |

(Continued)

FOREIGN PATENT DOCUMENTS

| | | |
|---|---|---|
| EP | 1 063 801 A2 | 12/2000 |
| FR | 2 775 547 A1 | 3/1999 |

(Continued)

OTHER PUBLICATIONS

European Search Report for European Application No. 02250204.1, issued Sep. 18, 2003.

*Primary Examiner* — M. Phan
(74) *Attorney, Agent, or Firm* — Sterne, Kessler, Goldstein & Fox PLLC

(57) ABSTRACT

A system and method are presented for changing physical layer (PHY) parameters in a PHY device of a communications system. New parameters are written to a first-in first-out queue in a serial interface, while the scheduled time for the changeover is written to a control register in the serial interface. When the time for the changeover occurs, the parameters are written to the PHY device via a port of the serial interface.

18 Claims, 4 Drawing Sheets

(56) References Cited

U.S. PATENT DOCUMENTS

| | | |
|---|---|---|
| 6,728,234 B1 * | 4/2004 | Hofmann et al. ............ 370/350 |
| 6,751,230 B1 | 6/2004 | Vogel et al. |
| 6,898,755 B1 | 5/2005 | Hou |
| 6,909,715 B1 * | 6/2005 | Denney et al. ............. 370/392 |
| 6,952,430 B2 | 10/2005 | Lacey, III |
| 6,961,314 B1 * | 11/2005 | Quigley et al. ............. 370/252 |
| 6,963,541 B1 | 11/2005 | Vogel et al. |
| 6,965,616 B1 * | 11/2005 | Quigley et al. ............. 370/480 |
| 7,006,535 B2 | 2/2006 | Denney et al. |
| 7,039,939 B1 * | 5/2006 | Millet et al. ............... 725/111 |
| 7,082,133 B1 * | 7/2006 | Lor et al. .................. 370/392 |
| 7,110,398 B2 | 9/2006 | Grand et al. |
| 7,139,283 B2 * | 11/2006 | Quigley et al. ............. 370/432 |
| 7,577,148 B2 * | 8/2009 | Lor et al. .................. 370/392 |
| 7,715,437 B2 * | 5/2010 | Denney et al. ............. 370/474 |
| 2001/0055319 A1 | 12/2001 | Quigley et al. |
| 2002/0061012 A1 | 5/2002 | Thi et al. |
| 2002/0064155 A1 | 5/2002 | Yen et al. |
| 2002/0093935 A1 | 7/2002 | Denney et al. |
| 2002/0093972 A1 | 7/2002 | Hollums |
| 2002/0121413 A1 * | 9/2002 | Jurrens ..................... 188/266 |
| 2005/0190696 A1 * | 9/2005 | Denney et al. ............. 370/229 |
| 2007/0280105 A1 * | 12/2007 | Barkay et al. ............. 370/229 |
| 2008/0046952 A1 * | 2/2008 | Denney et al. ............. 725/125 |
| 2008/0212473 A1 * | 9/2008 | Sankey et al. ............. 370/235 |

FOREIGN PATENT DOCUMENTS

| | | |
|---|---|---|
| WO | WO 97/40449 | 10/1997 |
| WO | WO 99/38274 | 7/1999 |
| WO | WO 00/28712 A2 | 5/2000 |

* cited by examiner

SYSTEM, METHOD, AND COMPUTER PROGRAM PRODUCT FOR SCHEDULING BURST PROFILE CHANGES BASED ON MINISLOT COUNT

CROSS-REFERENCE TO RELATED APPLICATION

This application is a continuation of U.S. Pat. No. 7,379,469, filed on Jun. 18, 2001, which claims the benefit of U.S. Provisional Application No. 60/261,273, filed Jan. 12, 2001, both of which are incorporated herein by reference in their entirety.

BACKGROUND OF THE INVENTION

1. Field of the Invention

The invention described herein pertains to communications systems, and more particularly to physical layer parameter changes.

2. Background Art

In modern digital communications systems, communicating entities need to have a common, predetermined set of protocols and parameters. Given these protocols and parameters, the entities can communicate in an orderly, efficient manner. Such protocols and parameters are typically implemented according to general functionality. The various functions are often collectively modeled as multiple layers of a protocol stack. Each layer represents additional protocols that a communicating entity must process, and/or parameters that must be adopted. The lowest layer in the protocol stack is typically the physical layer. The physical layer establishes fundamental parameters relating to the format of signals over a physical medium. These parameters can include, for example, the modulation method to be used, the error detection and correction method, the number of symbols to be transmitted per second, the number of bits that are represented by each symbol, and, if bandwidth is allocated in terms of time slots, the slot size. In the context of a burst communications system, such parameters collectively represent a burst profile.

One example of a communications system standard that specifies a physical layer is the Data Over Cable System Interface Specification (DOCSIS). DOCSIS was originally conceived for cable communications systems. While DOCSIS can be applied to such communications systems, it is not necessarily limited to cable. Wireless communications systems, for example, can also operate under DOCSIS. Likewise, DOCSIS can be used in satellite communications systems.

DOCSIS can be used in communication systems that include a set of remote communications devices connected to a headend device, such that the headend is responsible for the management of communications both to and from the remotes. The headend is responsible for the distribution of information content to the remotes (the so-called "downstream" direction); in addition, the headend is responsible for management of communications in the other direction, from the remotes to the headend (the "upstream" direction). Generally, in addition to sending content to remotes, the headend issues downstream messages that instruct each remote as to when it can transmit upstream, and what kind of information it can send. In effect, the upstream bandwidth is controlled and allocated by the headend. Any given remote can transmit upstream only after requesting bandwidth and receiving a grant of the bandwidth from the headend. In a time division multiple access (TDMA) environment, bandwidth corresponds to one or more intervals of time. Moreover, the upstream can be organized into a number of channels, with several remotes assigned to each channel. This arrangement allows the headend to manage each upstream communications channel. In this manner, upstream communications are managed so as to maintain order and efficiency and, consequently, an adequate level of service.

In the realm of cable communications, DOCSIS specifies the requirements for interactions between a cable headend and associated remote cable modems. A cable headend is also known as a cable modem termination system (CMTS). DOCSIS consists of a group of specifications that cover operations support systems, management, and data interfaces, as well as network layer, data link layer, and physical layer transport. Note that DOCSIS does not specify an application layer. The DOCSIS specification includes extensive media access layer and physical (PHY) layer upstream parameter control for robustness and adaptability. DOCSIS also provides link layer security with authentication. This prevents theft of service and some assurance of traffic integrity.

The current version of DOCSIS (DOCSIS 1.1) uses a request/grant mechanism for allowing remote devices (such as cable modems) to access upstream bandwidth. DOCSIS 1.1 also allows the provision of different services to different parties who may be tied to a single modem. With respect to the processing of packets, DOCSIS 1.1 allows segmentation of large packets, which simplifies bandwidth allocation. DOCSIS 1.1 also allows for the combining of multiple small packets to increase throughput as necessary.

Security features are present through the specification of 56-bit Data Encryption Standard (DES) encryption and decryption, to secure the privacy of a connection. DES is also used for authentication. DOCSIS 1.1 also provides for payload header suppression, whereby repetitive ethernet/IP header information can be suppressed for improved bandwidth utilization. DOCSIS 1.1 also supports dynamic channel change. Either or both of the downstream and upstream channels can be changed on the fly. This allows for load balancing of channels, which can improve robustness.

Sometimes it may be necessary to change the PHY parameters in a communications system. For example, user requirements may change such that a different symbol rate is needed. PHY parameters may also have to be changed as a result of changes in the communications environment. For example, if the communications environment becomes noisy, a different method of error correction coding may be required.

DOCSIS provides a method in which PHY parameters (i.e., a burst profile) can be changed. Such a change requires a reprogramming of components that handle PHY processing, including PHY devices at the headend. The parameter change process for headend PHY devices is illustrated generally in FIG. 1. The process as illustrated pertains to changing PHY parameters for upstream communications. The process starts with step 105. In step 110, the new PHY parameters for a given upstream channel are determined. In step 115, an upstream channel descriptor (UCD) is formulated. The UCD is a message sent from the headend to remote devices and contains the new PHY parameter values. In step 120, the UCD is sent downstream. In step 125, a determination is made as to the point in the upstream at which the new parameters are to take effect. In step 130, a downstream MAP message is formulated stating when, in the upstream, the change is to occur. Note that such a message is commonly denoted in capitalized form, "MAP"; this convention is used hereinafter. The role of MAP messages, generally, is to manage the upstream transmissions of remote devices. Such a message typically allocates, i.e., maps, specific time intervals in the upstream to specific remote devices, thereby allowing a given remote device to transmit upstream only in a specified time interval.

Note that upstream time intervals are defined based on a clock having a predetermined frequency, such as 10.24 MHz. Such a clock can, in some systems, be interpreted in terms of time units, or "ticks." Each tick can, for example, be 6.25 microseconds. Ticks can be further organized into larger units called minislots. The number of ticks per minislot can be defined at the discretion of the headend. The available upstream bandwidth can therefore be viewed as a series of minislots. Moreover, MAP messages allocate the upstream bandwidth in terms of minislots.

In the case of changing PHY parameters in DOCSIS, a specific time interval (i.e., minislot sequence) is identified in which all remotes are barred from transmitting upstream. This is the interval in which reprogramming of the PHY devices with the new parameters is to take place. Because no remote devices are allowed to transmit during this interval, the interval is referred to as "dead time." DOCSIS specifies that the dead time last one millisecond.

Returning to FIG. 1, in step 135, the MAP message is sent downstream.

In step 140, the changeover point arrives (i.e., the start of first minislot of the dead time, as specified in the MAP message) and a central processing unit (CPU) at the headend is interrupted. This interrupt must be handled during the dead time. In step 145, the new parameters are written, via a port of the CPU, to the headend PHY device. The write process is driven by software executing on the CPU. The process concludes at step 150.

The method of FIG. 1 however places a significant burden on the software executing on the CPU of the headend. Within the dead time interval, the software receives the interrupt, must process the interrupt immediately and write the new parameters to the local PHY devices. Typically, the write process is performed by the CPU via a relatively slow serial interface. The write process can take up to six hundred microseconds. Therefore, to complete processing within a one millisecond dead time interval can be a challenge. Moreover, if the dead time is exceeded, remote devices may begin transmitting, using the new PHY parameters, before the headend is ready. As a result, upstream data may be lost. Hence there is a need for a system and method that allows efficient reprogramming of PHY devices at the headend, such that there is minimal risk of exceeding the dead time.

BRIEF SUMMARY OF THE INVENTION

The present invention is a system and method for changing physical layer (PHY) parameters in a PHY device of a communications system. New parameters are written to a first-in first-out queue in a serial interface, such as a serial peripheral interface (SPI), while the scheduled time for the changeover is written to a control register in the serial interface. In an embodiment of the invention, the serial interface is located at a media access controller at the headend. When the time for the changeover occurs, the parameters are written to the PHY device via a serial interface port.

This avoids an otherwise significant burden on the software executing on the headend CPU. Without the invention, the software would have to receive and process an interrupt, then write any new parameters to the local PHY devices. In addition, this write process may have to be performed via a relatively slow serial interface. The interrupt handling and write process must take place within a brief (e.g., one millisecond) dead time interval. Moreover, if the dead time is exceeded, remote devices may begin transmitting before the headend is ready, resulting in a loss of upstream data.

In contrast, the invention described herein has the feature of prestoring new physical layer parameters in advance of actual reprogramming of the PHY device. The invention has the additional feature of prestoring the time of changeover. As a result, the invention has the advantage of allowing rapid reprogramming of the PHY device, without real-time intervention of the CPU, once the time for changeover arrives.

The foregoing and other features and advantages of the invention will be apparent from the following, more particular description of a preferred embodiment of the invention, as illustrated in the accompanying drawings.

DETAILED DESCRIPTION OF THE INVENTION

A preferred embodiment of the present invention is now described with reference to the figures, where like reference numbers indicate identical or functionally similar elements. Also in the figures, the left-most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Overview

The present invention is a system and method for changing upstream PHY parameters in a headend PHY device of a communications system. In the context of a burst communications system, new PHY parameters represent a new burst profile. Once the new parameters are known, they are written to a first-in first-out (FIFO) transmit queue in a serial interface, such as a serial peripheral interface (SPI). In an embodiment of the invention, the serial interface is located in a media access controller (MAC) at the headend. Once the scheduled time for the changeover is determined, the time is written to a control register in the interface. When the time for the changeover arrives, the parameters are written to the local PHY device via an interface port. This serves to reprogram the PHY device. The invention allows new parameters to be prestored in advance of reprogramming; moreover, the reprogramming effectively becomes a scheduled event. At the designated time, the reprogramming is triggered. Interrupt handling by a headend CPU is no longer necessary, and a time-consuming write by the CPU to the PHY device is avoided.

II. System

The system of the invention includes a serial interface, such as a serial peripheral interface (SPI), in a media access controller at the headend. While the system of the invention, as described hereinafter, includes an SPI, note that this does not represent a limitation of the invention. A person of ordinary skill in the art will recognize that the invention can operate with any of a variety of serial interfaces that include, but are not limited to, an SPI. An interIC ($I^2C$) serial interface, for example, can also be used.

The interface contains storage for the prestoring of new PHY parameters. The serial interface also contains one or more control registers that can be programmed with the time at which parameter changeover is to occur. The storage of this information in the interface allows for fast and efficient reprogramming of PHY devices at the headend.

Figure 1:
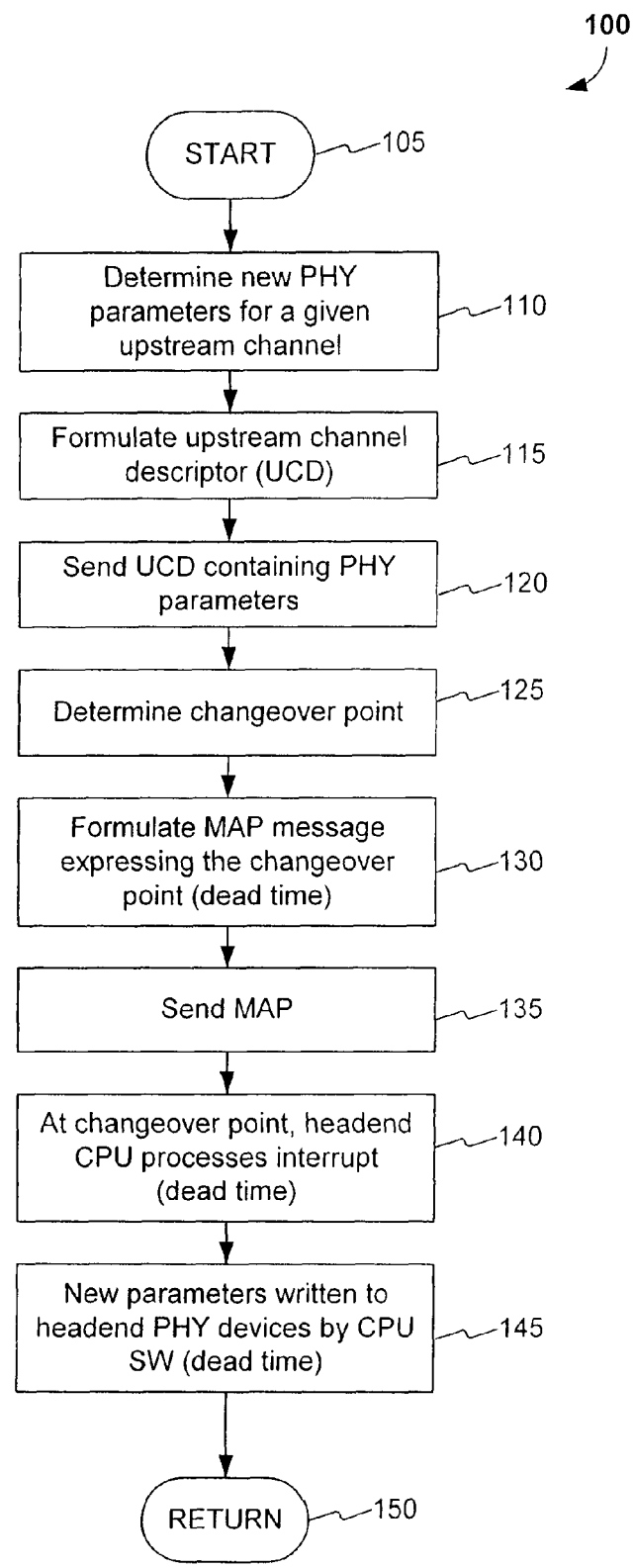
FIG. 1 is a flowchart illustrating the process of reprogramming headend PHY devices with new parameters according to the DOCSIS standard.
Figure 2:
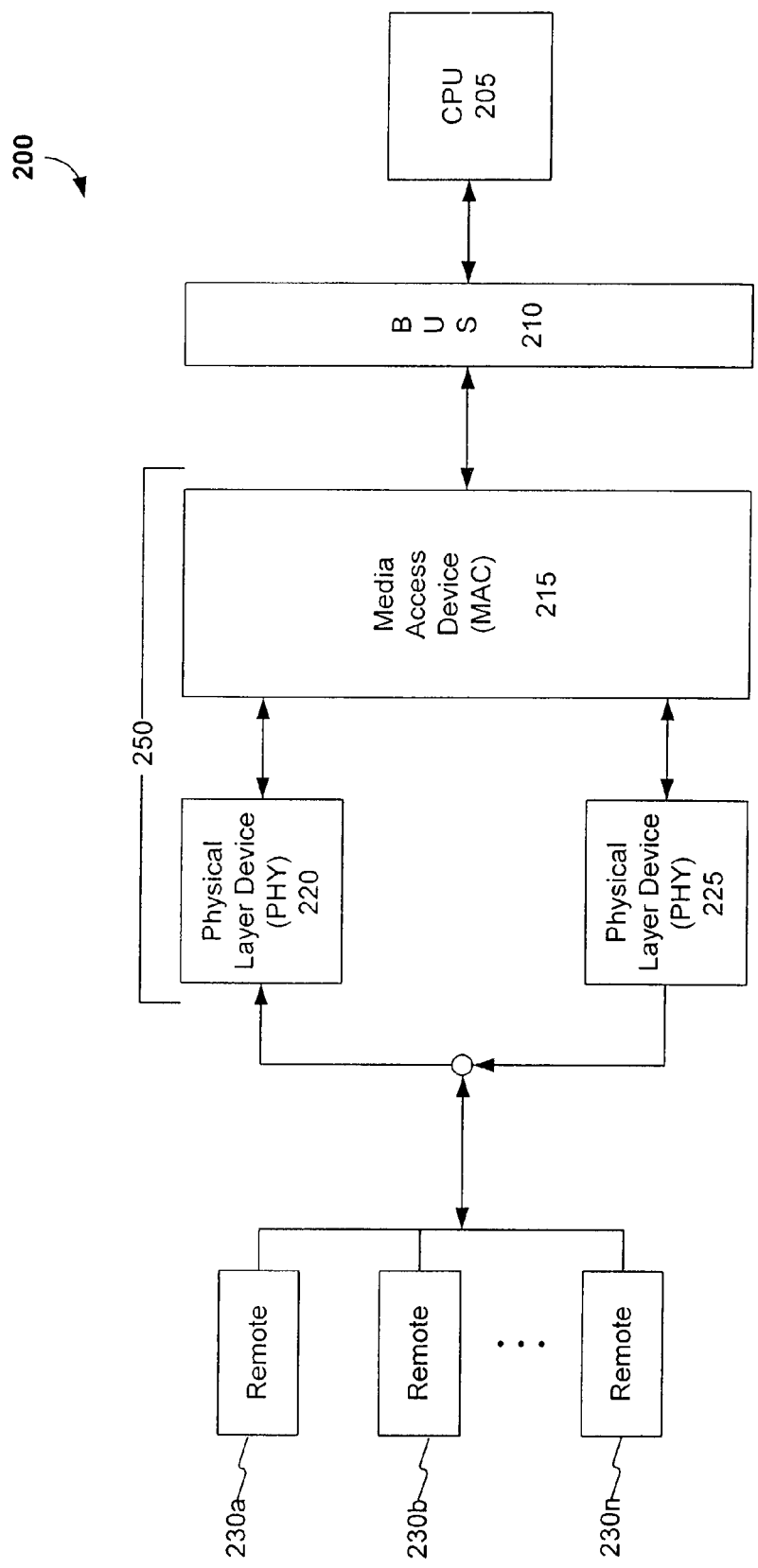
FIG. 2 is a block diagram illustrating headend functional components, including PHY devices, and associated remote devices.

The system context of the invention is illustrated in FIG. 2. A central processing unit (CPU) 205 is associated with the headend. CPU 205 communicates with a media access controller (MAC) 215, typically via bus 210. In an embodiment of the invention, bus 210 is a peripheral component interconnect (PCI) bus. Media access controller 215 is responsible for processing of the protocol and format requirements associated with the media access layer of the communications protocol. As will be described in greater detail below, it is the media access controller 215 that houses the serial interface. Media access controller 215 is connected to one or more PHY devices, shown here as devices 220 and 225. These devices perform processing required for the physical layer. One example of a PHY device is the BCM 3138, available from BROADCOM Corporation, of Irvine, Calif. Components 205 through 225 are all located at the headend. In the context of a cable communications system, these components are part of the CMTS. Remote devices associated with the headend are illustrated as devices 230a-230n. In the context of a cable communications system, remote devices 230a-230n can be cable modems, such as any of the BCM 93350 family of cable modems, also available from BROADCOM Corporation.

Figure 3:
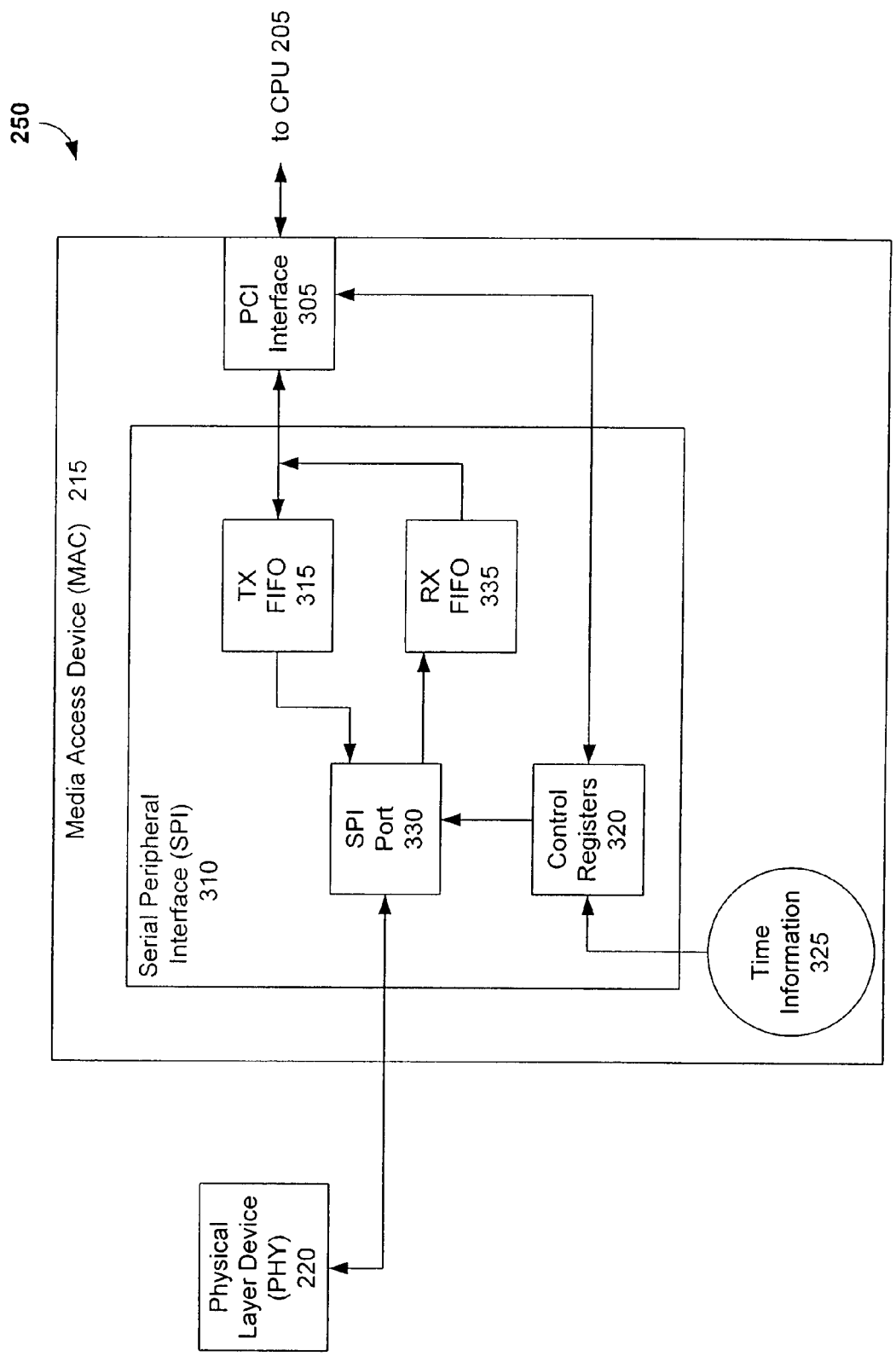
FIG. 3 is a block diagram illustrating the system of the present invention, according to one embodiment.

Media access controller 215 and PHY device 220 are collectively labeled as assembly 250. Assembly 250 is illustrated in greater detail in FIG. 3. Media access controller 215 communicates with CPU 205 via an internal interface 305. In an embodiment of the invention, interface 305 can be a PCI interface. In an alternative embodiment, interface 305 can be of another type, such as the INTEL i960 or comparable interface. The information that media access controller 215 receives from CPU 205 includes any new PHY parameters that need to be programmed into associated local PHY devices, such as PHY device 220. PHY parameters can include the number of symbols to be transmitted upstream per second, the number of bits per symbol, and specification of the modulation process and the error detection/correction method. Media access controller 215 also receives information from CPU 205 regarding when a PHY device is to start using the new parameters. The new parameters and the timing information for the changeover are saved in a serial interface, such as SPI 310.

In particular, new PHY parameters are stored in transmit queue 315. In an embodiment of the invention, transmit queue 315 is a first-in first-out (FIFO) queue. Timing information for the changeover of parameters is written to one or more control registers 320. In the context of a communications system that operates under the DOCSIS standard, the changeover time information can be expressed and recorded in control registers 320 by naming an interval of minislots during which the changeover is to take place. Accordingly, control registers 320 also receive time information 325 which represents a regular update as to the current point in time of the upstream. In the context of a DOCSIS system, time information 325 represents the current minislot count. When the current time information 325 matches the changeover timing information received from CPU 205, control registers 320 enable transmit queue 315 to send the new PHY parameters. The new PHY parameters are then sent to PHY device 220 via SPI port 330. Note that SPI 310 also includes a receive queue 335. Receive queue 335 receives and stores read information, and is shown here for the sake of completeness.

In an embodiment of the invention, an analogous system can be used at a remote device (e.g., a cable modem). Such a system can prestore new PHY parameters for subsequent reprogramming of a remote PHY device at a predetermined time.

III. Method

Figure 4:
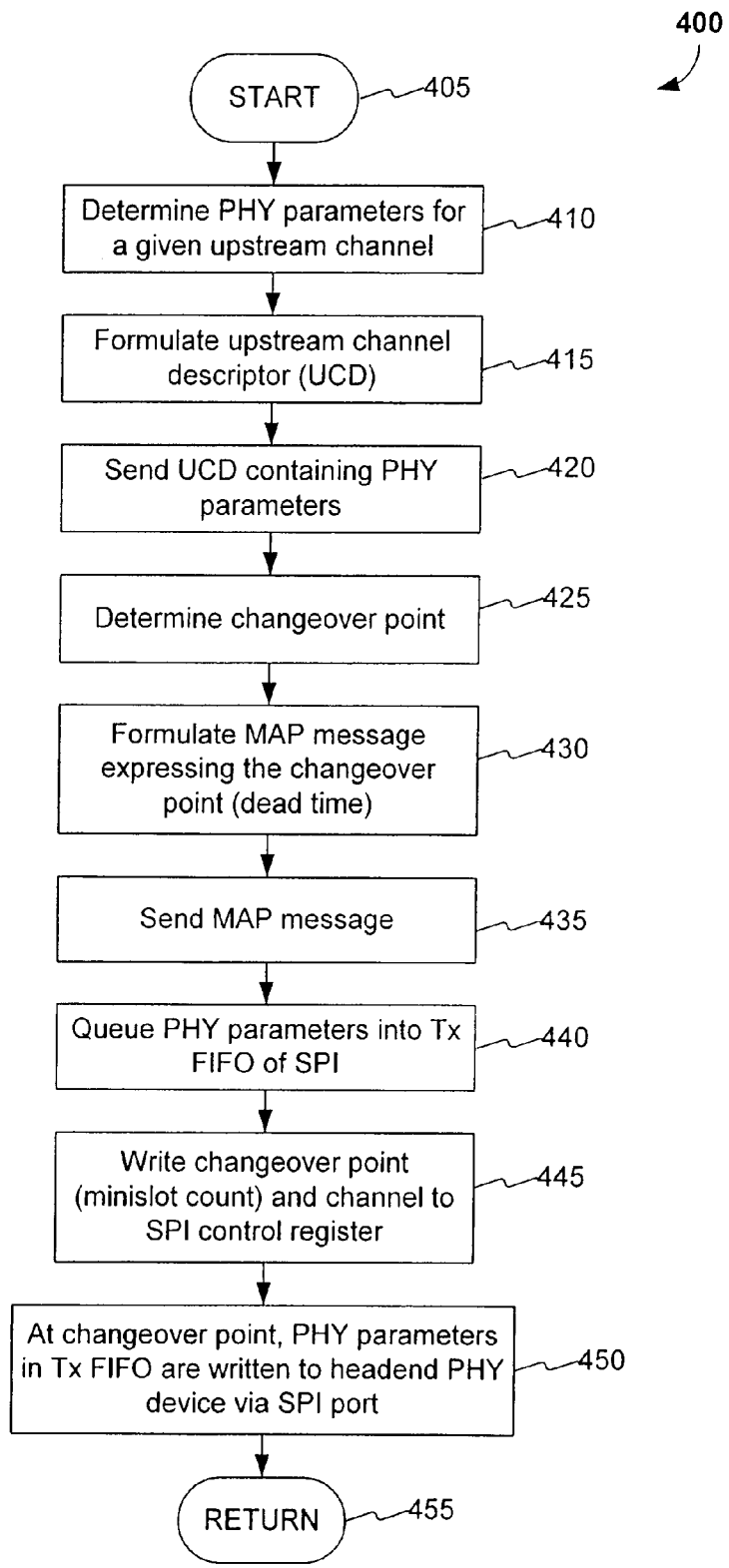
FIG. 4 is a flowchart illustrating the processing of the invention, according to an embodiment.

The method of the invention is illustrated in FIG. 4. The method begins with step 405. In step 410, any new PHY parameters for a given upstream channel are determined. In step 415, an upstream channel descriptor (UCD) is formulated. The UCD is a message generated at the headend. It is sent ultimately to PHY devices associated with the remote devices. This transmission takes place in step 420. In step 425, a determination is made as to when the new PHY parameters are to be first used. In step 430, a MAP message is formulated that states when the changeover is to take place (the dead time) and when the new PHY parameters are to be first used. In a communications system using the DOCSIS standard, the changeover point is defined in terms of a minislot count. The MAP message in DOCSIS system therefore specifies the minislots during which the changeover is to take place. It is during this time that the remote devices are to reprogram their PHY devices with the new PHY parameters. During this designated dead time, no remote devices are to transmit upstream. The MAP message is sent to remote devices in step 435.

In step 440, the new PHY parameters are queued into a transmit queue of a serial interface, such as a SPI. As described above, in an embodiment of the invention, this queue is structured as an FIFO queue. In step 445, the changeover point is written to a control register of the serial interface, e.g., a SPI control register. As discussed above, the changeover point can be defined in terms of a minislot count in a DOCSIS system. In addition, in an embodiment of the invention, a specific upstream channel to which the new parameters are to apply can also be written to the control register. In step 450, the changeover point occurs, and the new PHY parameters that had been stored in the transmit queue are written to the appropriate headend PHY device through a port of the serial interface, e.g., the SPI port, in the case of an SPI. The process concludes at step 455.

In an embodiment of the invention, an analogous method can be used at a remote device (e.g., a cable modem). In such a method, new PHY parameters can be prestored for subsequent reprogramming of a remote PHY device at a predetermined time.

IV. Conclusion

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A system to change one or more physical layer communications parameters as configured in a physical layer device of a wireless communications system, the system comprising:

a first interface for receiving the parameters; and a serial interface, in a Media Access Controller coupled to the first interface, configured to:
  store the parameters received by the first interface in advance of sending the parameters to the physical layer device, and
  send the parameters to the physical layer device at a predetermined time, wherein the parameters correspond to a burst profile that is used to reprogram the physical layer device of the wireless communications system.

2. The system of claim 1, wherein the first interface is a peripheral component interconnect (PCI) interface.

3. The system of claim 1, wherein the serial interface is a serial peripheral interface (SPI).

4. The system of claim 1, further comprising:
a central processing unit (CPU) configured to send the parameters to the first interface.

5. The system of claim 1, wherein the serial interface comprises:
  a transmit first-in first-out (FIFO) queue configured to store the parameters;
  a serial interface port configured to send the parameters to the physical layer device; and
  one or more control registers configured to store an indication of the predetermined time at which the parameters are to be sent from the transmit queue to the physical layer device.

6. The system of claim 5, wherein the one or more control registers are further configured to store a channel identifier which corresponds to a communications channel to which the parameters pertain.

7. A method of changing one or more physical layer communications parameters in a physical layer device of a wireless communications system, comprising:
  receiving the parameters;
  storing the parameters in a serial interface;
  receiving information specifying a point in time at which the parameters are to changeover; and
  at the point in time at which the parameters are to changeover, writing the parameters to the physical layer device of the wireless communications system.

8. The method of claim 7, wherein the parameters correspond to a burst profile that is used to reprogram the physical layer device of the wireless communications system.

9. The method of claim 7, wherein the storing comprises storing the parameters in a transmit first-in first-out (FIFO) queue in the serial interface.

10. The method of claim 7, wherein the point in time at which the parameters are to changeover corresponds to a minislot count.

11. The method of claim 7, further comprising:
storing an indication of the point in time at which the parameters are to changeover in one or more control registers of the serial interface prior to the writing.

12. The method of claim 7, wherein the writing comprises:
writing the parameters to the physical layer device via a serial interface port in the serial interface.

13. The method of claim 7, further comprising:
receiving periodic updates of a current time prior to the writing.

14. The method of claim 13, wherein the periodic updates are minislot counts.

15. The method of claim 7, further comprising:
storing the point in time at which the parameters are to changeover in the serial interface prior to the writing.

16. The system of claim 1, wherein the predetermined time is based on a minislot count.

17. The system of claim 1, wherein the serial interface further comprises a control register configured to store the predetermined time at which the parameters are to be sent from a transmit queue in the serial interface to the physical layer device.

18. The system of claim 1, wherein the parameters corresponding to the burst profile include one or more of: a number of symbols to be transmitted upstream per second, a number of bits per symbol, a specification of a modulation process, or a method of error detection or correction.

* * * * *